United States Patent [19]

Oak

[11] 4,136,372

[45] Jan. 23, 1979

[54] PROTECTIVE BOOT FOR A HIGH VOLTAGE CIRCUIT INTERRUPTER

[76] Inventor: Reginald O. Oak, 230 Somerset Ave., Fairfield, Conn. 06430

[21] Appl. No.: 776,584

[22] Filed: Mar. 11, 1977

[51] Int. Cl.² .................... H02B 1/14; H01H 31/02; H01B 17/56

[52] U.S. Cl. ................... 361/131; 150/52 R; 174/5 R; 200/48 P; 200/48 SB; 200/304

[58] Field of Search ............... 174/5 R, 45 R, 138 R, 174/138 F, 139; 200/48 P, 48 A, 48 KB, 48 SB, 48 CB, 304, 305; 74/558.5, 563; 150/52 R, 52 K; 361/131, 132

[56] References Cited

U.S. PATENT DOCUMENTS

| 914,042 | 2/1909 | Harrison et al. | 174/5 R |
|---|---|---|---|
| 1,867,894 | 7/1932 | Rush | 174/5 R X |
| 2,236,208 | 3/1941 | Creel | 74/563 X |
| 2,583,901 | 1/1952 | Talley | 150/52 R |
| 2,682,591 | 6/1954 | Killian | 200/304 X |
| 3,105,990 | 10/1963 | Harris, Jr. et al. | 150/52 R |
| 3,778,682 | 12/1973 | Bright | 174/138 F X |

FOREIGN PATENT DOCUMENTS

| 1054523 | 4/1959 | Fed. Rep. of Germany | 174/45 R |
|---|---|---|---|
| 705117 | 4/1966 | Italy | 174/139 |
| 124847 | 3/1928 | Switzerland | 174/5 R |

OTHER PUBLICATIONS

Advertisement: "Pernax Bird Guards," *The Electrical Review* (London), Jan. 15, 1926, lower half of page XVIII.

*Primary Examiner*—Laramie E. Askin
*Attorney, Agent, or Firm*—Wooster, Davis & Cifelli

[57] ABSTRACT

A protective boot of flexible, insulating material for use in covering the grounded portions of a circuit interrupter and thereby preventing accidental shorting between the current carrying sections of the circuit interrupter and the grounded portions. The standard, pole-mounted circuit interrupter consists of a number of movable switches used in high voltage applications where shorting can be extremely damaging to the unit. The protective boot of the invention is fabricated in a number of separate parts which correspond to the individual grounded elements of the interrupter. Thus, when in place, the boot will substantially encase the entire grounded portion providing the requisite insulation. At the same time, due to the number of separate parts of the boot, installation on pole-mounted interrupters is easily accomplished, and at the same time, the moving parts of the switches remain unobstructed.

5 Claims, 6 Drawing Figures

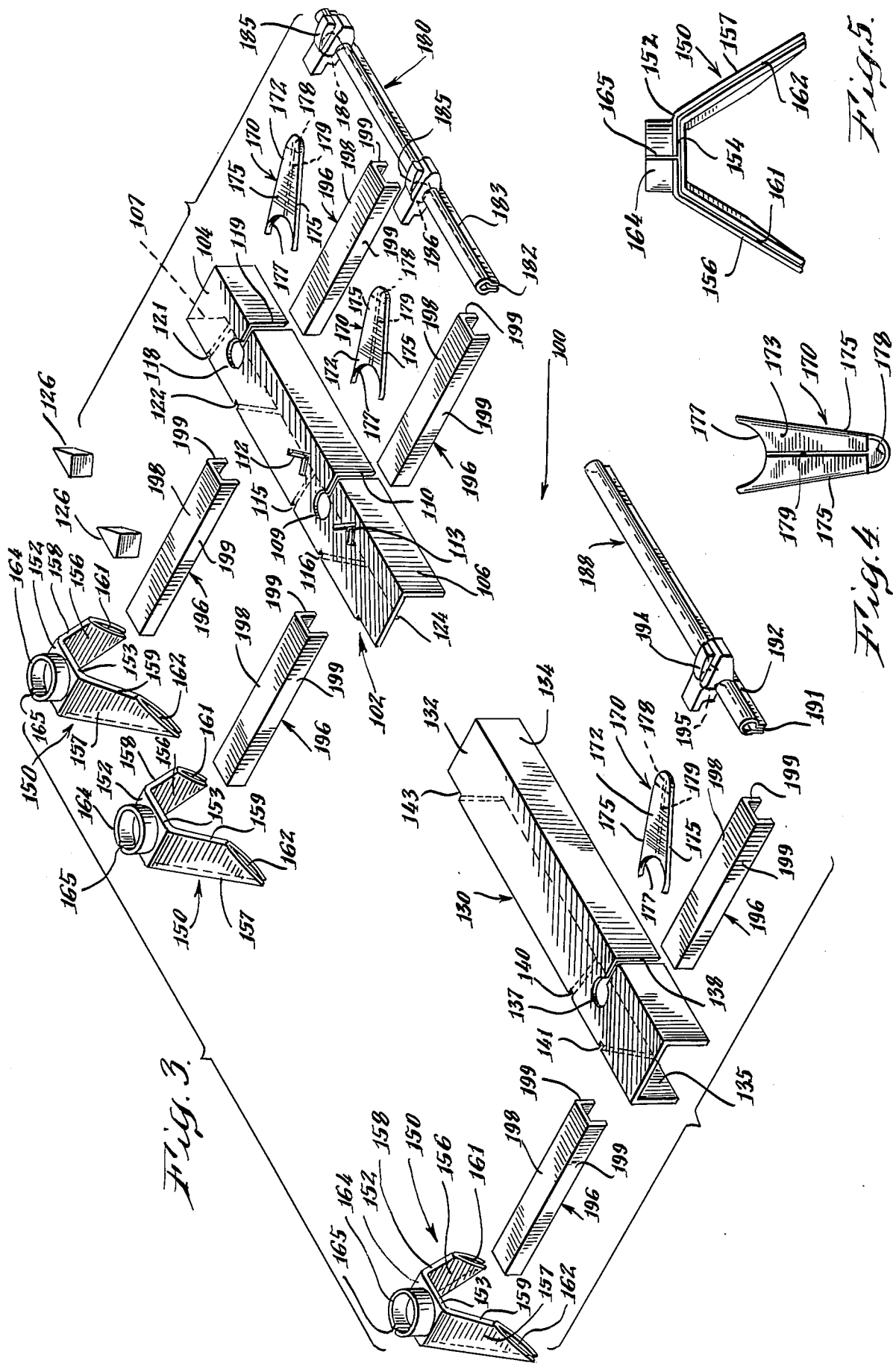

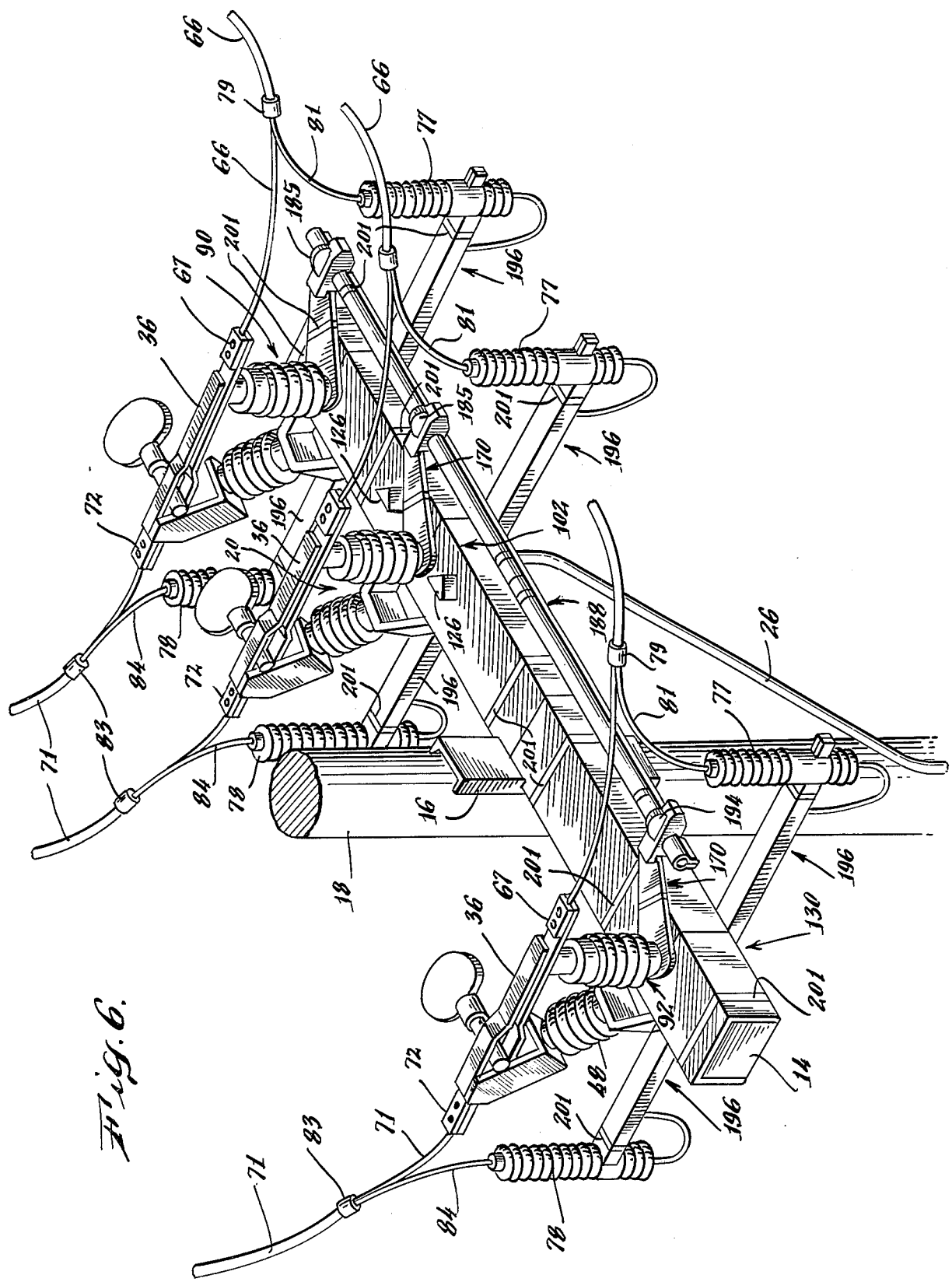

PROTECTIVE BOOT FOR A HIGH VOLTAGE CIRCUIT INTERRUPTER

BACKGROUND OF THE INVENTION

This invention relates to a protective boot for use with a pole-mounted circuit interrupter of the type commonly used in connection with high voltage power lines.

The high voltage circuit interrupter is well-known in the prior art and generally consists of a number of standard switches mounted on a crossbeam. The switches are generally used to break the individual power lines when it is necessary to effect repairs or reroute the currrent. However, because of the nature of these switches, the electrically conductive portion is uninsulated. At the same time, as a safety measure, the crossbeam on which the switches are mounted as well as other portions of the switching mechanism itself are grounded. Under these circumstances, it is of paramount importance that the portion of the switch along with the wires carrying the high current be constantly separated from the grounded section of the interrupter switch, or a short circuit would result causing great damage to the circuit interrupter and disrupting the current flow in the power lines.

To prevent this, a number of standard high voltage ceramic insulators are used to separate the current carrying parts of the switches from the grounded pieces, and therefore, under normal conditions, short circuits would not occur. Under actual operating conditions, however, it has been found that squirrels or other types of climbing animals have accidentally bridged the gap between the conductive, current carrying parts of the switches and the grounded portions thereby causing a short which effectively destroys one or more of the switches and requires the complete replacement of the entire circuit interrupter.

A number of techniques have been tried in the prior art to prevent accidental short circuits of this nature, but none has been entirely successful. In some cases, the circuit interrupters have been hung upside down or fiberglass crossbeams used, but both have proved to be impractical in view of the amount of work and expense involved in altering the large number of already installed interrupters. And further, neither method has been entirely effective as exposed grounded parts remain accessible. Another attempted solution has been the use of a dielectric paint to cover and thereby insulate the metal parts of the grounded portion of the interrupter. This has been ineffective as the paint can be easily burned through when contacted by the very high current involved thereby creating a short. Further, the paint is very susceptible to damage by the elements and often chips making the insulating protection incomplete.

Consequently, because of the wide use in the power industry of the circuit interrupters, there is a serious need for an effective means for protecting the devices from this destructive shorting out which can be easily applied to existing circuit interrupters which are already in use and mounted on the poles.

SUMMARY OF THE INVENTION

A protective boot according to the invention herein is made of insulating material and effectively encases all of the grounded portions of the circuit interrupter. The protective boot generally comprises a plurality of individual pieces each molded out of an insulting material such as thermoplastic and of sufficient thickness to prevent burn through when contacted by a high voltage line. The individual pieces of the protective boot are all flexible and shaped like the corresponding portions of the circuit interrupter they protect. The pieces of the protective boot are precut and appropriately slotted to permit easy installation on circuit interrupters already mounted on poles. Further, due to the fact that the protection boot is made in a plurality of parts, the movement of the grounded portions of the switching mechanisms will not be interfered with when the protective boot is in place. When the protective boot is installed, it completely covers all of the grounded portions of the circuit interrupter and thereby prevents any accidental shorting out from occurring.

Accordingly, a principal object of the present invention is to provide an effective protection against the accidental shorting out of a circuit interrupter.

Another object of the present invention is to provide an effective insulation for the grounded portions of a circuit interrupter which is easily installed on existing interrupters already in use.

Other and more specific objects of the invention will be in part obvious and will in part appear from the following description of the preferred embodiments and claims taken together with the drawings.

DRAWINGS

FIG. 3 is an exploded view of a protective boot according to the invention herein;

FIG. 4 is a bottom view of an operating lever covering of the protective boot;

FIG. 5 is a rear view of a support cover of the protective boot; and

FIG. 6 is a perspective view of the protective boot installed on a circuit interrupter.

The same reference numbers refer to the same elements throughout the various Figures.

DESCRIPTION OF THE PREFERRED EMBODIMENTS

Figure 1:
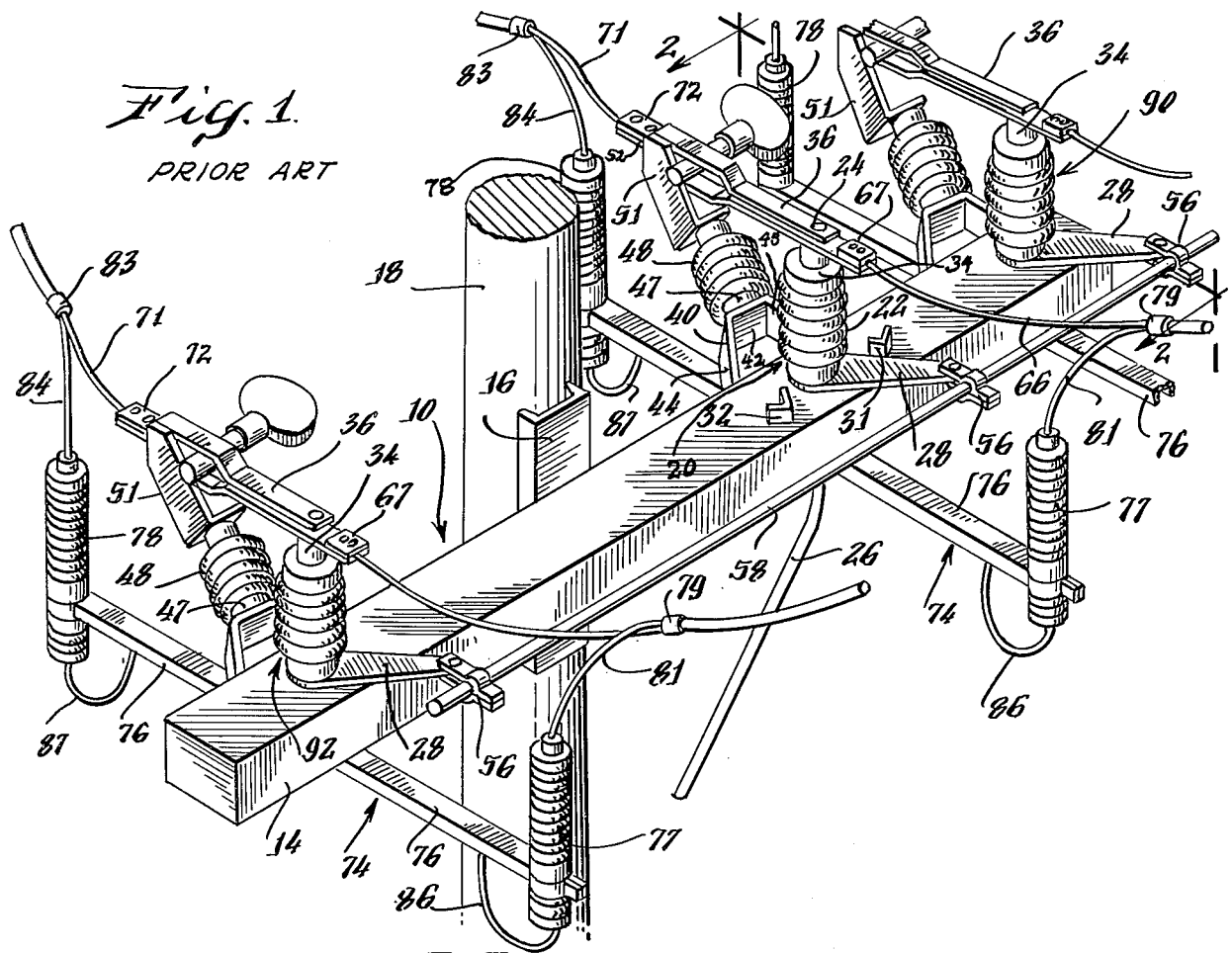
FIG. 1 is a perspective view of a circuit interrupter mounted on a pole.

Referring now to FIG. 1, a standard circuit interrupter is shown at 10. The circuit interrupter 10 generally comprises a metal crossbeam 14 having a master switch 20 and a pair of slave switches 90, 92 disposed thereon. The crossbeam 14 has a metal plate 16 connected at the midpoint of one of the vertical sides. The plate 16 vertically extends above and below the crossbeam 14 and is used to affix the entire circuit interrupter 10 to the upper portion of a pole 18.

Figure 2:
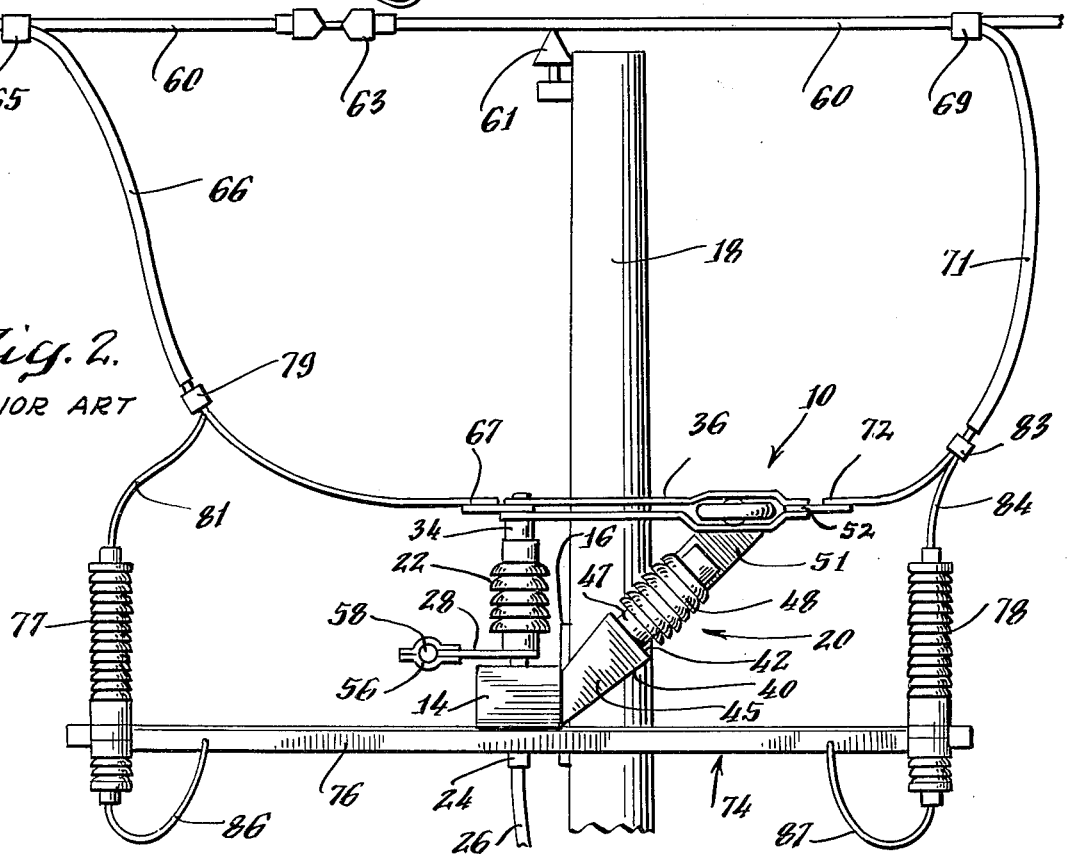
FIG. 2 is a side view of a pole mounted circuit interrupter taken along lines 2—2 of FIG. 1.

As shown in FIG. 1, the master switch 20 is disposed on the crossbeam 14 nearest the pole 18. The master switch 20 is comprised of a cylindrical ceramic insulator 22, of a type common in high voltage applications, mounted on the top of the crossbeam 14 and extending upwardly therefrom. The high voltage insulator 22 is electrically nonconductive. A nonconductive rod 24 is centrally disposed in and extends through the high voltage insulator 22 and through the crossbeam 14 so that the lower end of the rod 24 is exposed. The insulted rod 24 is arranged so as to be rotatable when it is in place. As shown in FIG. 2, a rotatable control crank 26 extends up the side of the pole 18 and is linked to rotate the lower end of the nonconductive rod 24 as it extends from the bottom of the crossbeam 14. Consequently, rotation of the control crank 26 will cause a similar rotation in the nonconductive rod 24.

As shown in FIG. 1, a metal operating lever 28 is essentially tear-drop shaped and radially attached at the center of its widest point to the nonconductive rod 24 between the crossbeam 14 and the high voltage insulator 22. The operating lever 28 extends outwardly, and as it is independent of both the crossbeam 14 and the insulator 22, rotation of the nonconductive rod 24 causes a similar rotation in the operating lever 28. A pair of "V" shaped metal stops 31, 32 are disposed on the top of the crossbeam 14 on opposite sides of the master switch 20. The stops 31, 32 extend upwardly from the crossbeam 14 to a sufficient height to limit the travel of the operating lever 28. As shown in FIG. 1, the operating lever is disposed to extend forwardly away from the pole 18 and can only move between the stops 31, 32. This restriction also affects the amount of rotation of the nonconductive rod 24 to which the operating lever 28 is attached. A metal top plate 34 is disposed on top of the high voltage insulator 22 and the nonconductive rod 24 extends therethrough. One end of a double-bladed switch 36 is fastened to the top of the nonconductive rod 24 above the top plate 34. The double-bladed switch 36 is conductive and unshielded. As the double-bladed switch 36 is attached to the nonconductive rod 24, rotation of the nonconductive rod 24 will also cause a rotation of the double-bladed switch 36.

A metal support 40 is attached to the pole side of the crossbeam 14 directly opposite the high voltage insulator 22. The support 40 is comprised of a square plate 42, and a left leg 44 and a right leg 45 are attached to opposite edges and extend downwardly therefrom. The legs 44, 45 are substantially trapezoidal in shape with one nonparallel side connected to the square plate 42 while the other nonparallel side is connected to the vertical, pole side of the crossbeam 14. This results in the square plate 42 being tilted away from the high voltage insulator 22. Both legs 44, 45 are spread outwardly from the square plate 42 for stability. A circular tub 47 having an open top is centrally disposed on the square plate 42.

One end of a high voltage support insulator 48 of the same type as the high voltage insulator 22 is disposed in the circular tub 47 of the support 40 and extends upwardly therefrom. A metal brace 51 is connected to the top of the support insulator 48, and the brace 51 holds a horizontal contact point 52 along its side opposite the pole 18. When the master switch 20 is closed, the end of the double-bladed switch 36 opposite the nonconductive rod 24 makes an electrical connection with the contact point 52, as best shown in FIG. 2.

Referring now to FIG. 2, the master switch 20 is wired in the following manner. A power line 60 is run through a wire connector 61 mounted on the top of the pole 18. The power line 60 is not continuous but instead is broken by a dead-end insulator 63 through which current cannot flow. A first hot line clamp 65 is electrically connected to an exposed portion of the power line 60 on one side of the dead end insulator 63, and a first switch wire 66 electrically connects this first hot line clamp 65 to the end of the double-bladed switch 36 connected to the nonconductive rod 24. A bolted clamp 67 secures the first wire 66 to the double-bladed switch 36. Similarly, a second hot wire clamp 69 is electrically connected to an exposed portion of the power line 60 on the side of the dead end insulator 63 opposite the first hot wire clamp 65. A second wire 71 electrically connects the second hot wire clamp 69 to the contact point 52 where the second wire 71 is held in place by a second bolted clamp 72. Accordingly, when the master switch 20 is closed so that the double-bladed switch 36 is electrically connected to the contact point 52, the current from the power line 60 flows through the double-bladed switch 36 and all the metal parts connected thereto.

As shown in FIG. 1, the master switch 20 is provided with a lightning arrester assembly 74. The lightning arrester assembly 74 consists of a bar 76 which is attached to and extends perpendicularly from the underside of the crossbeam 14. The point of attachment for the lightning arrester bar 76 is almost directly below the master switch 20. The bar 76 has a front lightning insulator 77 and a rear lightning insulator 78 attached at opposite ends. As shown in FIG. 2, a third hot wire clamp 79 is electrically connected to an exposed portion of the first wire 66 near the double-bladed switch 36, and a third wire 81 electrically connects the third hot wire clamp 79 to the top of the front lightning insulator 77. Similarly, a fourth hot wire clamp 83 is electrically connected to an exposed portion of the second wire 71 near the contact point 52, and a fourth wire 84 electrically connects the fourth hot wire clamp 83 to the top of the rear lightning insulator 78. The lightning insulators 77, 78 themselves are nonconductive and their bottoms are grounded to the bar 76 by respective grounding wires 86, 87.

As shown in FIG. 1, a right slave switch 90 and a left slave switch 92 are also provided. The slave switches 90, 92 are disposed at opposite ends of the crossbeam 14 and control separate power lines (not shown), and are constructed of parts identical to those of the master switch 20 with the exception that the control crank 26 is not connected to either of the slave switches 90, 92. The electrical connections with the respective power lines are exactly the same for each individual switch. The end of the operating lever 28 of the master switch 20 opposite the nonconductive rod 24 is pivotally attached to a connector 56. The connector 56 supports a control pipe 58 which is positioned in front of the crossbeam 14 opposite the pole 18. The control pipe 58 is parallel to the crossbeam 14 and extends almost its entire length. The respective operating levers of the right slave switch 90 and the left slave switch 92 are also pivotally connected to the control pipe 58 through separate connectors so that all the operating levers are parallel to each other. Consequently, when the operating lever 28 of the master switch 20 rotates, a corresponding rotation is created in the operating levers of the slave switches 90, 92.

In operation, all the switches are normally closed so current flows around the respective dead end insulators. In this condition, the operating lever 28 of the master switch 20 is adjacent to the "V" stop 31 on the right. When it is necessary to cut off the current, the control crank 26 on the pole 18 is rotated until the operating lever 28 strikes the left "V" stop 32. In this position, the double-bladed switch 36 has swung away from the contact point 52 thereby breaking the circuit. Correspondingly, the movement of the operating lever 28 is transmitted to the slave switch operating levers opening them in the same manner. All of the upper parts of these switches, 20, 90, 92 carry a very high current through a great number of unshielded parts, while the crossbeam 14 and all the assorted metal parts directly connected thereto are grounded. Under normal conditions, the high voltage insulators and the lightning insulators sufficiently separate the current carrying portion and the grounded portion. However, if this gap is bridged while the circuit interrupter's switches are closed, a short will result which will virtually destroy the interrupter and require its costly replacement.

Referring now to FIG. 3, the protective boot according to the invention herein is shown at 100. The protective boot 100 is flexible and made of insulating material, such as thermoplastic, which not only provides good electrical insulation, but also can withstand rough handling, weather and adverse effects of strong acids, alkalines and severe corrosives. The entire boot 100 is fabricated of sufficient thickness to eliminate the possibility of burn through in the event of an electrical fault whereby the boot would contact a high voltage. As shown in FIG. 3, the protective boot 100 is fabricated in a number of individual parts to facilitate installation on existing interrupter switches which are already in operation and mounted on poles, and at the same time permit the movement of a number of parts of the grounded portion of the circuit interrupter 10 which is essential to its proper operation.

The protective boot 100 is generally comprised of a left crossbeam cover 130 and a right crossbeam cover 102. The right crossbeam cover 102 has a rectangular top which is slightly wider than the crossbeam 14 and approximately half as long. A front side 106 and a rear side 107 extend downwardly from the respective longitudinal edges of the top 104, and the sides 106, 107 are approximately the same height as that of the height of the crossbeam 14. When in place, the right crossbeam cover 102 completely covers and thereby insulates the exposed metal surface of the right side of the crossbeam 14 with the exception of the bottom of the crossbeam 14 and the vertical end portion of the crossbeam 14 opposite the pole 18. As shown in FIG. 3, a first hole 109 is provided in the top 104 near the pole end of the right crossbeam cover 102. The hole is positioned close to the front side 106 so that when the cover 102 is in place, the nonconductive rod 24 of the master switch 20 will rotatably fit through it. A first slot 110 extends from the first hole 109 vertically down through the front side 106. The first slot 110 permits the right crossbeam cover 102 of the protective boot 100 to be installed without the need for either first removing the high voltage insulator 22 which has a much greater diameter than that of the nonconductive rod 24 or making the hole 109 of a great enough diameter to slip over the high voltage insulator 22. Consequently, the right crossbeam cover 102 covers a maximum of the exposed metal of the crossbeam 14 while remaining easy to install.

A pair of small V-shaped slots 112, 113 are provided in the top 104 on either side of the first hole 109. The V slots 112, 113 are arranged so that when the right crossbeam cover 102 of the protective boot 100 is in place, the metal stops 31, 32 fit through and protrude upwardly from the respective V slots 112, 113. A pair of support slots 115, 116 are disposed in the rear side 107 of the right crossbeam cover 102 immediately behind the first hole 109. These support slots 115, 116 extend from the top 104 to the bottom of the rear side 107 and are arranged to accommodate the legs 45, 44 of the support 40 of the master switch 20.

As shown in FIG. 3, the right crossbeam cover 102 has a second hole 118 in the top 104 at the end opposite the hole 109. The second hole 118 is longitudinally aligned with the first hole 109 and is of the same diameter. The second hole 118 is adapted to fit the nonconductive rod of the right slave switch 90, and a second slot 119 extends from the second hole 118 down the front side 106 in the same manner as with the first slot 110. Similarly, a second pair of support slots 121, 122 are disposed in the rear side 107 behind the second hole 118. As with the support slots 115, 116 of the first hole 109, the support slots 121, 122 of the second hole 118 are disposed to fit the legs of the support of the right slave switch 90.

A rectangular cutout 124 is also provided in the rear side 107 at the pole end. This rectangular cutout 124 provides a space for the attachment plate 16 and thereby permits the right crossbeam cover 102 to be fitted on the crossbeam 14 without interference with the plate 16 which holds the entire circuit interrupter 10 to the pole 18 as previously explained.

A left crossbeam cover 130 is also provided to insulate the left side of the crossbeam 14. The left crossbeam cover 130 has a rectangular top 132 with a front side 134 and a rear side 135 extending downwardly therefrom which are generally of the same dimensions as the left side of the crossbeam 14. As shown in FIG. 3, a third hole 137 is disposed in the top 132 of the left crossbeam cover 130 near the end opposite the pole 18. The hole 137 is located near the front side 134, and when the left crossbeam cover 130 is in place, the nonconductive rod of the left slave switch 92 fits through the third hole 137. A third slot 138 is provided which extends from the third hole 137 down to the bottom of the front side 134 of the left crossbeam cover 130. As with the slots 110, 119 of the right crossbeam cover 102, the third slot 138 allows the left crossbeam cover 130 to be placed over the crossbeam 14 without the need for removal of the high voltage insulator of the left slave switch 92. Also, a pair of support slots 140, 141 are located behind the third hole 137 and extend from the top 132 of the left crossbeam cover 130 down the rear side 135. The slots 140, 141 are arranged to accommodate the legs of the support of the left slave switch 92. As also shown in FIG. 3, the left crossbeam cover 130 has a rectangular cutout 143 at the pole end of the rear side 135 which allows the left cover 130 to be fitted over the left side of the crossbeam 14 without interference with the attachment plate 16.

Consequently, when both the right crossbeam cover 102 and the left crossbeam cover 130 are in place, the upper part of the crossbeam 14 is entirely covered and insulated with the exception of the metal stops 31, 32 which protrude therethrough. In order to cover the stops 31, 32, an insulation cap 126 which is made of the same material as the rest of the protective boot 100 is provided for each stop 31, 32. These caps 126 fit over the respective stops 31, 32 covering them completely.

As shown in FIGS. 3 and 5, a support covering 150 is provided to insulate the metal support 40 of the master switch 20. The support covering 150 comprises a square plate cover 152 which is formed by doubling over a piece of the insulating material. This creates a fold 153 at its front end and correspondingly forms a slot-like square space 154 in between which extends from the rear of the support covering 150 to the fold 153. This square space 154 is adapted to receive and entirely cover the square plate 42 of the support 40 when the support covering 150 is in place.

A right leg covering 156 and a left leg covering 157 are provided and extend downwardly from the square plate covering 152. The leg coverings 156, 157 are substantially the same shape as the legs 44, 45 of the support 40. As with the square plate covering 152, the leg coverings 156, 157 are also made by doubling over a single piece of insulating material thereby forming a right front fold 158 for the right leg covering 156, and a left front fold 159 for the left leg covering 157. The remaining sides of each are open. This creates a slot-like space 161 for the right leg covering 156 and a similar space 162 for the left leg covering 157. Both the leg spaces 161, 162 extend from the rear of the support covering 150 to the respective front folds 158, 159, and, as the entire support covering 150 is made of a single piece of material, both are internally connected to the space 154 of the square plate cover 152. At the same time, the fold 153 of the square plate cover 152 is contiguous with the folds 158, 159 of the leg coverings 156, 157.

A circular tub sidewall 164 whose diameter is slightly greater than that of the circular tub 47 of the support 40, is made of insulated material and is centrally disposed on top of square plate cover 152. The portion of the insulated material of the square plate cover 152 which is inside the circular tub sidewall 164 is removed which therefore results in the space inside the circular tub sidewall 164 being directly connected with the square space 154 inside the square plate cover 152. As best shown in FIG. 5, a small slit 165 is provided in the rear of the sidewall 164 which extends entirely through the sidewall 164 to the beginning of the square space 154 in the rear of the support covering 150. The entire support covering 150 can be molded of a single piece of insulating material, and can be placed over the support 40 by simply bending open the spaces 154, 161, 162 and the sidewall slit 165 and fitting it over the support 40. The leg coverings 156, 157 completely surround the respective legs 45, 44 of the support 40 while the square plate cover 152 protects and insulates the square plate 42. At the same time, the sidewall 164 surrounds and protects the circular tub 47. As a result, all of the grounded portions of the support 40 are fully insulated. Two other identical support coverings are also used for the supports of the slave switches 90, 92.

As shown in FIGS. 3 and 4, a hollow operating lever covering 170 is provided for the operating lever 28 of the master switch 20. The operating lever covering 170 is made of the insulating material and has a top 172 and a bottom 173. These are longitudinally connected by a pair of short, rounded sides 175. A semicircular cutout 177 which is of slightly greater diameter than that of the base of the high voltage insulator 22 is disposed in the switch end of the operating lever covering 170. When the operating lever covering 170 is in place, this semicircular cutout 177 allows the operating lever covering 170 to continually fit flush against the cylindrical high voltage insulator 22 regardless of the position of the operating lever 28. Further, because of this cutout 177, the operating lever covering 170 does not interfere with the movement of the operating lever 28 with respect to the high voltage insulator 22. The end portion of the bottom 173 of the operating lever covering 170 opposite the semicircular cutout 177 is also cut away forming a connector opening 178, as shown in FIG. 5. This connector opening 178 provides a space for the pivot connection between the end of the operating lever 28 and the connector 56 on the control pipe 58. This connector opening 178 permits the operating lever 28 to move with respect to the control pipe 58 when the operating lever covering 170 is in place. A bottom slit 179 extends the length of the bottom 173 from the connector opening 178 to the semicircular cutout 177. The operating lever covering 170 can therefore be made in one piece and slipped over the operating lever 28 by fitting the lever 28 through the bottom slit 179. When in place, the operating lever 28 is insulated. Two other identical operating lever coverings are provided for the operating levers of the slave switches 90, 92.

A right tube 180 which is made of the insulating material is also provided. The right tube 180 is hollow and is intended to cover and thereby insulate the right half of the control pipe 58 when the tube 180 is in place. In order to fit the right tube 180 on the connector pipe 58 without dismantling it, the right tube 180 is provided with a longitudinal slit 182 extending the entire length of the bottom of the tube 180. The slit 182 is bounded by a pair of lips 183 which facilitates the opening of the slit 182 so that the right tube 180 can be placed over the right half of the control pipe 58. The right tube 180 has a pair of enlarged portions 185 disposed at opposite ends and adapted to receive the connectors 56 when the tube 180 is in place. Each of the enlarged portions 185 has a small side opening 186 which is disposed toward the crossbeam 14 and which extends downward to the slit 182 and permits the connector 56 to be inserted and remain in the right tube 180 while still pivotally attached to the end of the operating lever. Therefore, when the right tube 180 is in place, it completely encases and insulates the right half of the control pipe 58 without interfering with the movement of the control pipe 58 with respect to the operating levers of the switches 20, 90.

A left tube 188 is provided for the left side of the control pipe 58. The left tube 188 is arranged like the right tube 180 having a longitudinal slit 191 in its bottom extending its entire length and bounded by a pair of lips 192. The left tube 188 has a single enlarged portion 194 at the end opposite the pole 18 which corresponds to the single connector of the left slave switch 92. The enlarged portion 194 also has a side opening 195 which extends downward to the slit 191 and permits installation of the left tube 188 without interference in the operation of the switch 92. When the left and right tubes 180, 188 are in place, the entire structure of the control pipe 58 and connectors 56 are completely covered and insulated.

A pair of covers 196 for the top of the exposed portions of the bar 76 of the lightning arrester 74 is also provided. The bar covers 196 have a rectangular top 198 with a pair of sides 199 extending downwardly therefrom. Each bar cover 196 is intended to insulate that portion of the bar 76 between one of the lightning insulators and the crossbeam 14. When the bar covers 196 are in place, as shown in FIG. 6, the bar 76 of the lightning arrester assembly 74 of the master switch 20 is insulated. A separate pair of identical bar covers is provided for exposed portions of the bars of the lightning arrester associated with each of the slave switches 90, 92.

As shown in FIG. 6, when the entire protective boot 100 is in place, all of the grounded metal portions of the circuit interrupter 10 which might provide a place for a small animal to stand are completely and fully insulated, and, therefore, no short can occur between the current carrying metal portions of the individual switches and the grounded portions of the circuit interrupter. Further, because of the nature of the structure of the many various separate coverings, the protective boot 100 can be easily installed on existing circuit interrupters already mounted on the poles without the need for expensive and time consuming disassembling. Of course, it should also be noted that it is possible to fabricate the protective boot out of a different number of separate coverings than are disclosed herein, and it is possible to use a single piece of material. In the latter case, however, installation may be somewhat more difficult on existing circuit interrupters. Although the parts of the protective boot 100 are essentially form fitted, nonconductive tape 201 is used to make sure the parts stay in place, as shown in FIG. 6.

From the foregoing description of the invention and the discussion of the prior art, the numerous advantages and improvements incident to the invention will now be apparent to those skilled in the art. Accordingly, the above description of the invention is to be construed as illustrative only rather than limiting. This invention is limited only by the scope of the following claims.

I claim:

1. A multipart protective boot adapted for installation on an existing voltage circuit interrupter to insulate the grounded portions thereof against bridging contact with the high voltage conducting portions thereof caused by squirrels, other small climbing animals or foreign objects, the high voltage interrupter being of the type having a metal crossbeam attached to and supported on a pole, the crossbeam having top and side surfaces, a plurality of switches mounted at spaced apart points on the crossbeam, each switch including a first insulator mounted to and extending upwardly from the top surface of the crossbeam, the first insulator surrounding a nonconductive rotatable rod, a switch blade mounted to the rotatable rod adjacent the upper end of the first insulator opposite the crossbeam, a second insulator mounted to a side of the crossbeam via a metal support bracket having a top plate and depending legs, the legs connected to the crossbeam and the second insulator positioned in a circular tub of the top plate, the second insulator being angled away from the first insulator, a metal brace mounted to the top of the second insulator and supporting a switch contact positioned to receive the switch blade and thereby close the switch, and a metal operating lever attached to the rotatable rod between the first insulator and the crossbeam, the operating lever connected to a control pipe by a pivotal connector whereby the control pipe is connected to the operating levers of all of the plurality of switches thereby causing the rotatable rods to rotate together and the switches to open and close together, wherein one of the switches is a master switch characterized by crank means connected to the lower end of its rotatable rod under the crossbeam for rotating its rotatable rod to open and close the master switch and the other switches, the multipart protective boot being fabricated out of a flexible nonconductive material of sufficient thickness to prevent burn-through when contacted by a high voltage, the multipart protective boot comprising:

(A) a crossbeam cover having a rectangular top portion dimensioned to cover the top of the crossbeam and having depending side portions extending downwardly from the top portion for covering the sides of the crossbeam, the top of the crossbeam cover defining openings positioned to permit the rotatable rods of the switches to pass therethrough and further defining a slot extending from each opening to an edge of the crossbeam cover wherein the crossbeam cover may be fitted over the crossbeam without removing the switches, and one side portion of the crossbeam cover defining slots positioned for passing the legs of the metal support brackets for the second insulators of the switches therethrough;

(B) a support cover for each of the metal support brackets supporting the second insulators of the switches, the support cover being fabricated out of a single piece of the nonconductive insulating material which is doubled over to form a continuous fold and having top plate cover and leg coverings extending from the fold to flank and cover the top plate and legs of the metal support bracket thereby defining a slot opposite said fold permitting the support cover to be slippled over the metal support bracket, the top plate cover further defining an opening surrounded by an upstanding circular wall for surrounding the circular tub, and the support cover defining a slot to its edge permitting the support cover to be installed without removing the second insulator;

(C) an operating lever cover for each operating lever, the operating lever covers being hollow and having a top and bottom longitudinally connected by a pair of rounded sides and having a semicircular cutout at one end which extends through the top and bottom for conforming to the adjacent first insulator and the bottom having a connector opening for accommodating the pivotal connector to the control pipe, the operating lever cover defining a longitudinal slot which extends along its bottom between the connector opening and the semicircular cutout to permit the operating lever cover to be fitted over the operating lever;

(D) a control pipe cover comprising a tube having a longitudinal slot extending along its entire length permitting it to be fitted over the control pipe, the control pipe cover having enlarged portions positioned for accommodating and substantially covering the pivotal connectors.

2. A multipart protective boot as defined in claim 1 wherein the circuit interrupter further comprises a lightning arrester for each of the plurality of switches, each lightning arrester comprising a lightning bar attached to the bottom of the crossbeam and extending outwardly therefrom on either side and an insulator mounted at each end of the lightning bar and extending upwardly therefrom, the protective boot further comprising:

(E) a pair of lightning bar covers for each lightning bar, each lightning bar cover having a rectangular top and a pair of sides extending downwardly therefrom, one of the lightning bar covers fitted over the lightning bar on one side of the crossbeam and the other lightning bar cover fitted over the lightning bar on the other side of the crossbeam.

3. A multipart protective boot as defined in claim 1 wherein the crossbeam of said circuit interrupter has stops extending upwardly therefrom and flanking the control lever of the master switch for limiting the rotation thereof, and the crossbeam cover of the protective boot defines slots permitting the stops to extend therethrough and the protective boot further comprises caps fitted over and covering the stops.

4. A multipart protective boot as defined in claim 3 wherein the crossbeam cover is provided in two pieces each of which covers substantially one-half of the crossbeam, the two pieces meeting at the approximate center of the crossbeam.

5. A multipart protective boot as defined in claim 1 wherein the control pipe cover is provided in two pieces each covering substantially one-half of the control pipe and meeting at the approximate center thereof.

* * * * *

UNITED STATES PATENT AND TRADEMARK OFFICE
CERTIFICATE OF CORRECTION

PATENT NO. : 4,136,372
DATED : January 23, 1979
INVENTOR(S) : Reginald O. Oak

It is certified that error appears in the above-identified patent and that said Letters Patent are hereby corrected as shown below:

Column 2, line 65, "insulted" should be --insulated--.

Column 5, line 27, insert --104-- after "top".

Column 9, line 20 (claim 1, line 2), insert --high-- before "voltage".

Column 10, line 12 (claim 1, line 64), "slippled" should be --slipped--.

Signed and Sealed this

First Day of May 1979

[SEAL]

Attest:

RUTH C. MASON
Attesting Officer

DONALD W. BANNER
Commissioner of Patents and Trademarks